US012220726B2

(12) United States Patent
Wang et al.

(10) Patent No.: US 12,220,726 B2
(45) Date of Patent: Feb. 11, 2025

(54) SILICIDE CAPACITIVE MICRO ELECTROMECHANICAL STRUCTURE AND FABRICATION METHOD THEREOF

(71) Applicant: Taiwan-Asia Semiconductor Corporation, Hsinchu (TW)

(72) Inventors: Di-Bao Wang, Hsinchu (TW); Chun-Chieh Lin, Hsinchu (TW)

(73) Assignee: TAIWAN-ASIA SEMICONDUCTOR CORPORATION, Hsinchu (TW)

(*) Notice: Subject to any disclaimer, the term of this patent is extended or adjusted under 35 U.S.C. 154(b) by 323 days.

(21) Appl. No.: 17/965,533

(22) Filed: Oct. 13, 2022

(65) Prior Publication Data

US 2023/0116389 A1 Apr. 13, 2023

Related U.S. Application Data

(60) Provisional application No. 63/255,020, filed on Oct. 13, 2021.

(51) Int. Cl.
*B06B 1/02* (2006.01)

(52) U.S. Cl.
CPC .................................. *B06B 1/0292* (2013.01)

(58) Field of Classification Search
None
See application file for complete search history.

(56) References Cited

U.S. PATENT DOCUMENTS 8,426,235 B2 * 4/2013 Chang ................. B81C 1/00476 257/E21.216
10,196,261 B2 * 2/2019 Rothberg ............ B81C 1/00182
10,509,013 B2 * 12/2019 Gerardo ............. H10N 30/2047
2012/0256520 A1 * 10/2012 Torashima ........... H10N 30/708 29/25.35
2013/0134528 A1 * 5/2013 Nguyen ............. H01H 59/0009 257/415
2014/0241129 A1 * 8/2014 Tomiyoshi .......... B81C 1/00626 367/140
2014/0375168 A1 * 12/2014 Dirksen .............. B81C 1/00373 427/79
2017/0333945 A1 * 11/2017 Torashima ............ B06B 1/0292
2018/0369862 A1 * 12/2018 Alie .................... B81C 1/00246

(Continued)

*Primary Examiner* — Tran N Nguyen
*Assistant Examiner* — Masoud Vaziri
(74) *Attorney, Agent, or Firm* — Muncy, Geissler, Olds & Lowe, P.C.

(57) ABSTRACT

The invention provides a silicide capacitive micro electromechanical structure and fabrication method thereof, comprising a substrate, a passivation layer, a silicon layer, a first metal layer, and a dielectric layer. The passivation layer is formed on the substrate; the silicon layer and the first metal layer are formed on the passivation layer. The first metal layer includes a contact part and a conductive part. The contact parts contact at least a part of the silicon layer, and the conductive portion extends away from the silicon layer to electrically connect an external circuit. The dielectric layer is formed on the passivation layer, and at least the silicon layer and the first metal layer are covered by the dielectric layer. After an annealing process is performed, the conductive portion remains in contact with the silicon layer after the silicidation reaction to maintain an electrical connection with the external circuit.

22 Claims, 12 Drawing Sheets

(56) References Cited

U.S. PATENT DOCUMENTS

| | | | | |
|---|---|---|---|---|
| 2019/0067424 | A1* | 2/2019 | Kudou | H01L 21/32135 |
| 2019/0133553 | A1* | 5/2019 | Belt | B06B 1/0292 |
| 2019/0275561 | A1* | 9/2019 | Fife | B81C 1/00238 |
| 2019/0321000 | A1* | 10/2019 | Takezaki | A61B 8/4444 |

* cited by examiner

SILICIDE CAPACITIVE MICRO ELECTROMECHANICAL STRUCTURE AND FABRICATION METHOD THEREOF

CROSS REFERENCE TO RELATED APPLICATIONS

This application claims priority of U.S. Provisional Application No. 63/255,020 filed on Oct. 20, 2021 under 35 U.S.C. § 119(e), the entire contents of all of which are hereby incorporated by reference.

FIELD OF THE INVENTION

The present invention relates to a micro electromechanical structure, particularly to a silicide capacitive micro electromechanical structure and the fabrication method thereof.

BACKGROUND OF THE INVENTION

Currently most ultrasonic transducers use piezoelectric components to send and sense ultrasonic waves via piezoelectric transduction. Take capacitive micro-machined ultrasonic transducers (CMUT) for example. CMUT transmits ultrasonic waves and senses returning waves to detect objects that are typically not visible and measure the distance in-between. Mostly conventional CMUT gaps are produced by etching with liquid or gas, i.e., chemical wet/dry etching, to remove the sacrificial layer and release the gaps. Such process has drawbacks like the liquid etchant tends to stick and stay on the components or it requires longer release time due to the limitation of mass transport rates. Therefore, a gap less than 100 nanometer is difficult to produce.

FIG. 1A is a schematic diagram of a conventional silicide capacitive micro electromechanical structure 100 without performing an annealing process. FIG. 1B is a schematic diagram of a conventional silicide capacitive micro electromechanical structure 1001 after performing an annealing process. The silicide capacitive micro electromechanical structure 1001 after the annealing process includes a bottom electrode 106, a top electrode 114 and a gap 120. The silicide capacitive micro electromechanical structure 100 has a first metal layer 110 and an amorphous silicon layer 112 silicified during the annealing process and forms silicon 130. Since the volume of the silicon 130 is less than the volumes of the first metal layer 110 and the amorphous silicon layer 112 reduced in the process, a nanometer-scale gap 120 is formed. The etchant-free method for forming gaps improves the drawbacks in utilizing gases and liquids for etching.

Besides, the conventional CMUT also requires supporting circuits or electronics such as application specific integrated circuits (ASICs). The CMUT is electrically connected to the external circuit or an ASIC via electrodes (including top electrodes and bottom electrodes). Both the top and bottom electrodes are formed by the same metal deposition process. If the metal (such as Aluminum, Nickle and Titanium) is deposited directly under the silicon 130 as the bottom electrode 106, the silicon atoms might be involved in the silicidation process, resulting in an incomplete silicidation silicidation reaction between the upper layer and the silicon, thereby unable to form a complete gap.

Therefore, it is an issue worth resolving to design an improved silicide capacitive micro electromechanical structure and the fabrication method thereof that can be a solution to the gap forming problems and arrangement of the bottom electrodes in the conventional CMUTs.

SUMMARY OF THE INVENTION

An objective of the present invention is to provide a silicide capacitive micro electromechanical structure that has undergone the annealing process.

To achieve the objective mentioned above, the silicide capacitive micro electromechanical structure of the present invention includes a substrate, a passivation layer, a silicon layer, a first metal layer and a dielectric layer. The passivation layer is formed on the substrate. The silicon layer and the first metal layer are formed on the passivation layer. The first metal layer includes a contact part and a conductive part. The contact part contacts at least partial of the silicon layer and the conductive part extends away from the silicon layer to be electrically connected to an external circuit. The dielectric layer is formed on the passivation layer and covers at least the silicon layer. Wherein after performing an annealing process, the electrical connection to the external circuit remains by having the conductive part stay contacting the silicon layer after silicidation reaction.

In an embodiment, the silicon layer consists of amorphous silicon, single-crystal silicon or polysilicon.

In an embodiment, the first metal layer consists of Nickel, Titanium, Platinum, Cobalt or Molybdenum.

In an embodiment, the dielectric layer consists of $SiO_2$, $Si_3N_4$, $Al_2O_3$, $Al_2O_5$, or $Al_3O_4$.

In an embodiment, the contact part produces a first silicide after the annealing process via silicidation silicidation reaction with the silicon layer.

In an embodiment, the contact part of the first metal layer covers a top of the silicon layer, at least partially covers one side of the silicon layer and forms a silicidation silicidation gap between the first silicide formed after the annealing process and the dielectric layer.

In an embodiment, the silicon layer forms in a shape of truncated circular cone and an inclined angle aside the truncated circular cone is between 20° and 70°.

In an embodiment, the width of the conductive part gradually increases as it gets closer to the silicon layer.

In an embodiment, the contact part is arranged between the silicon layer and the passivation layer.

In an embodiment, the silicide capacitive micro electromechanical structure further includes a barrier layer arranged between the first metal layer and the silicon layer.

In an embodiment, the first metal layer consists of Aluminum, Titanium, Tungsten, Gold, Platinum, Cobalt or Molybdenum.

In an embodiment, the silicide capacitive micro electromechanical structure further includes a second metal layer formed on the silicon layer and arranged between the silicon layer and the dielectric layer. Wherein a second silicide is produced after the annealing process via silicidation reaction of the silicon layer and the second metal layer, and a silicidation gap is formed between the second silicide and the dielectric layer.

In an embodiment, the contact part is a circular structure surrounding a center of the silicon layer and the second metal layer is formed in a depression structure formed on a top of the silicon layer.

In an embodiment, a minimum horizontal distance between the contact part and the second metal layer is between 1 μm and 5 μm.

In an embodiment, the silicide capacitive micro electromechanical structure further includes a top electrode and a passivation & coupling layer; the top electrode is formed on the dielectric layer and the passivation & coupling layer covers at least the top electrode.

The fabrication method of the silicide capacitive micro electromechanical structure includes the following steps: providing a substrate; forming a passivation layer on the substrate; forming a silicon layer and a first metal layer on the passivation layer, wherein the first metal layer includes a contact part and a conductive part as the contact part contacting at least partial of the silicon layer and the conductive part extending away from the silicon layer for electrical connection to an external circuit; forming a dielectric layer on the passivation layer, covering at least the silicon layer; and performing an annealing process, wherein the conductive part stays contacting the silicon layer for maintaining an electrical connection to the external circuit.

In an embodiment, the contact part of the first metal layer covers a top of the silicon layer and at least partial of one side of the silicon layer and produces a first silicide after the annealing process via silicidation reaction with the silicon layer, and a silicidation gap is formed between the first silicide and the dielectric layer.

In an embodiment, the contact part is disposed between the silicon layer and the passivation layer, and a step is further included before forming the dielectric layer on the passivation layer. The step is: forming a second metal layer on the silicon layer for the second metal layer to be arranged between the silicon layer and the dielectric layer; wherein a second silicide is formed after the annealing process via silicidation reaction of the silicon layer and the second metal layer, and a silicidation gap is formed between the second silicide and the dielectric layer.

Thereby the annealing process can be operated directly upon the silicide capacitive micro electromechanical structure, forming a silicidation gap via the silicidation reaction of the silicon layer and the metal layer to replace the conventional etching methods using gas or liquids; meanwhile, the electrical connection to the external circuits can be maintained. The amount of production for the silicide capacitive micro electromechanical structure can therefore be effectively increased and the production costs can be greatly reduced.

DETAILED DESCRIPTION OF THE PREFERRED EMBODIMENTS

In order to fully comprehend the objectives, features and efficacy of the present invention, a detailed description is described by the following substantial embodiments in conjunction with the accompanying drawings. The description is as below.

The description of unit, element and component in the present invention uses "one", "a", or "an". The way mentioned above is for convenience, and for general meaning of the category of the present invention. Therefore, the description should be understood as "include one", "at least one", and include the singular and plural forms at the same time unless obvious meaning.

The description of comprise, have, include, contain, or another similar semantics has the non-exclusive meaning. For example, an element, structure, product, or device contain multi requirements are not limited in the list of the content, but include another inherent requirement of element, structure, product or device not explicitly listed in the content. In addition, the term "or" is inclusive meaning, and not exclusive meaning.

Figure 1A:
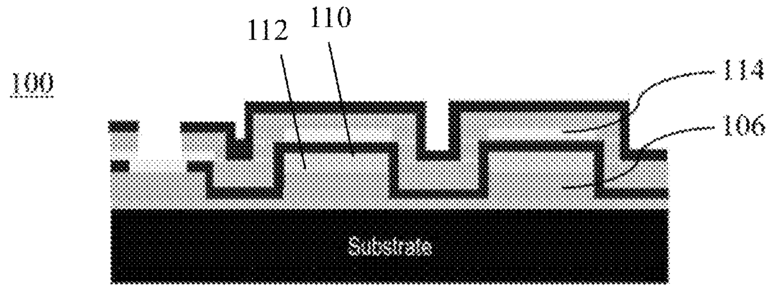
FIG. 1A is a schematic diagram of a conventional silicide capacitive micro electromechanical structure without performing an annealing process.
Figure 1B:
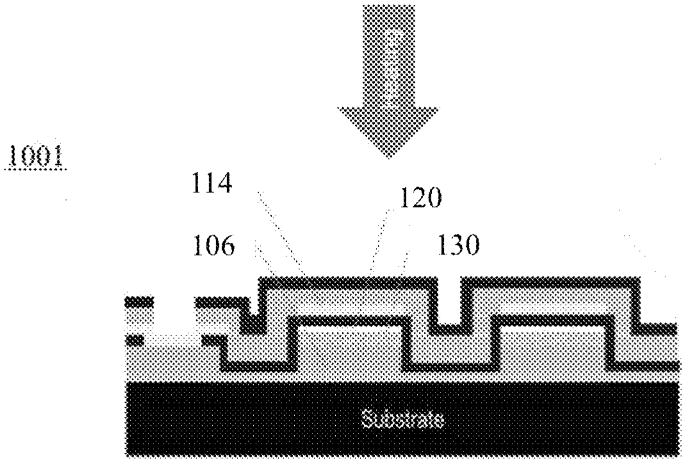
FIG. 1B is a schematic diagram of a conventional silicide capacitive micro electromechanical structure after performing an annealing process.
Figure 2A:
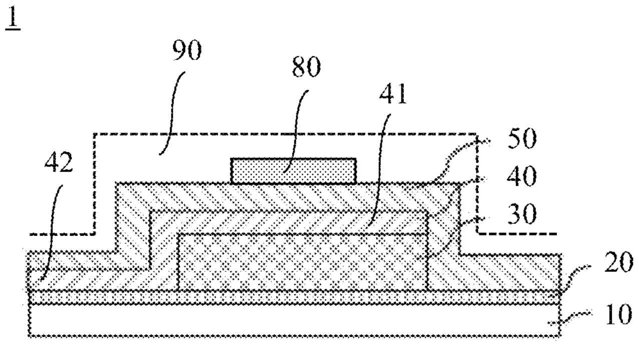
FIG. 2A is a schematic diagram of the present invention in a first embodiment, illustrating a silicide capacitive micro electromechanical structure without performing an annealing process.
Figure 2B:
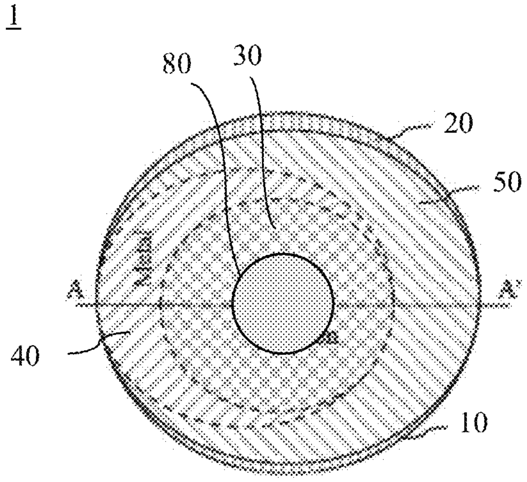
FIG. 2B is a top plan view of the present invention in the first embodiment, illustrating the silicide capacitive micro electromechanical structure without performing an annealing process.

With reference to FIGS. 2A-2D, a first embodiment of a silicide capacitive micro electromechanical structure 1 is illustrated. As shown in FIGS. 2A and 2B, the silicide capacitive micro electromechanical structure 1 includes a substrate 10, a passivation layer 20, a silicon layer 30, a first metal layer 40 and a dielectric layer 50. The substrate 10 functions as a basic element for arranging and disposing other material layers; in the following embodiments, the substrate 10 can be a semiconductor substrate but the present invention is not limited to such application. In this embodiment, the substrate 10 has a circular shape, but the shape of the substrate 10 can be various as needed.

The passivation layer 20 is formed on the substrate 10 and evenly covers an entire surface of one side of the substrate 10. Herein the passivation layer 20 consists of thermal Oxide, but is can also consist of $SiO_2$ or $Si_3N_4$.

The silicon layer 30 is formed on the passivation layer 20. In an embodiment, the silicon layer 30 consists of amorphous silicon (a-Si), single-crystal silicon (single c-Si) or polysilicon (poly-Si). In this embodiment, the silicon layer 30 is a layer of circular structure that partially covers the passivation layer 20; but the shape of the silicon layer 30 is not limited to a circular shape. It can be designed into various shapes as needed.

The first metal layer 40 is formed on the passivation layer 20. In an embodiment, the first metal layer 40 consists of Nickel (Ni), Titanium (Ti), Platinum (Pt), Cobalt (Co) or Molybdenum (Mo). In this embodiment, the first metal layer 40 covers roughly a circular area and partial of the passivation layer 20. But the area it covers is not limited to a circular one, either; the first metal layer 40 can be designed to cover an area in any shape as needed. The first metal layer 40 includes a contact part 41 and a conductive part 42 which are connected. The contact part 41 contacts at least partial of the silicon layer 30. For example, in this embodiment, the contact part 41 covers a top of the silicon layer 30 and at least partially covers one side of the silicon layer 30; but the present invention is not limited to such application. The conductive part 42 contacts the passivation layer 20 and extends away from the silicon layer 30 (e.g., the conductive part 42 extends horizontally away from aside of the silicon layer 30) to be electrically connected to an external circuit. The external circuit can be an application specific integrated circuit (ASIC) or a similar circuit. Additionally, the conductive part 42 is designed to have a large contact area with the silicon layer 30 to prevent the contact between the first metal layer 40 and the silicon layer 30 from breaking off after an annealing process.

The dielectric layer 50 is formed on the passivation layer 20 and covers at least the silicon layer 30 and the first metal layer 40. In embodiment, the dielectric layer 50 consists of $SiO_2$, $Si_3N_4$, $Al_2O_3$, $Al_2O_5$ or $Al_3O_4$. In this embodiment, the dielectric layer 50 covers roughly a circular area, completely on the silicon layer 30 and the first metal layer 40 and partially on the passivation layer 20. But the area it covers is not limited to a circular one, either; the dielectric layer 50 can be designed to cover an area in any shape as needed.

Certainly, in every embodiment, a top electrode 80 can be further formed on the dielectric layer 50. The top electrode 80 is electrically connected to the aforesaid external circuit (e.g., ASIC). And it at least partially covers the dielectric layer 50, but the present invention is not limited to such application. The top electrode 80 can be in a layer structure similar to the one of the first metal layer 40 and extends horizontally for electrical connection to the external circuit. The top electrode 80 consists of Ni, Ti, Pt, Co or Mo. However, the top electrode 80 is already a basic element in a conventional silicide capacitive micro electromechanical structure. In order to present the features and structure of the present invention more clearly, the top electrode 80 will not be shown in the figures of the following embodiments.

Figure 2C:
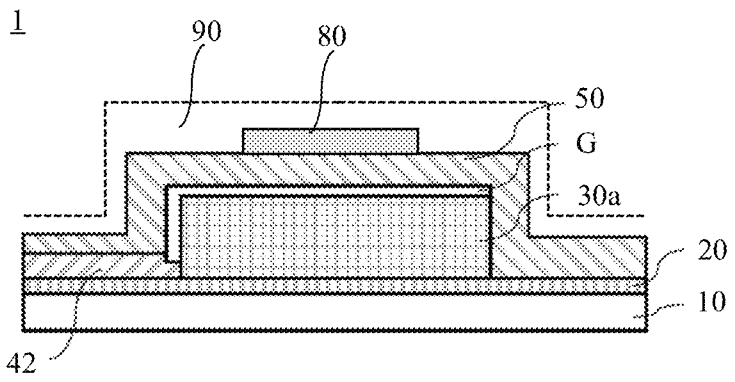
FIG. 2C is a schematic diagram of the present invention in the first embodiment, illustrating the silicide capacitive micro electromechanical structure after performing an annealing process.

In the embodiments, a passivation & coupling layer 90 can be further formed on the dielectric layer 50 (as shown in FIGS. 2A and 2C in dotted lines), and the passivation & coupling layer 90 covers the dielectric layer 50 and the top electrode 80. The passivation layer in the passivation & coupling layer 90 includes $SiO_2$ or $Si_3N_4$, and the coupling layer in the passivation & coupling layer 90 includes epoxy resin, polymer and molding compounds. However, the passivation & coupling layer 90 is already a basic element in a conventional silicide capacitive micro electromechanical structure. In order to present the features and structure of the present invention more clearly, it will not be shown in FIGS. 2B and 2D in this embodiment or in the figures of the following embodiments.

Figure 2D:
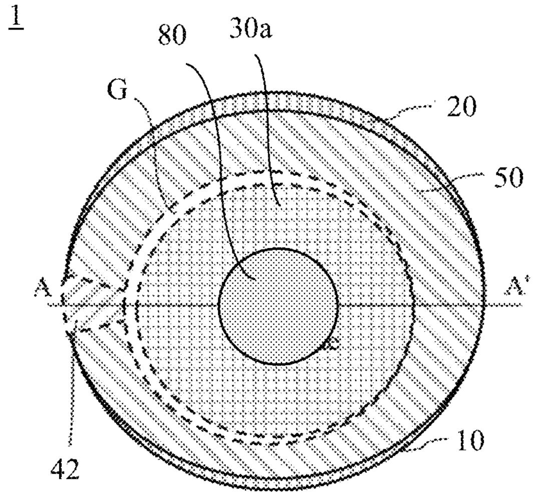
FIG. 2D is a top plan view of the present invention in the first embodiment, illustrating the silicide capacitive micro electromechanical structure after performing an annealing process.

As shown in FIGS. 2C and 2D, since the contact part 41 of the first metal layer 40 directly contacts the silicon layer 30, after an annealing process, the contact part 41 produces a first silicide 30*a* via silicidation reaction with the silicon layer 30 under the high temperature. Furthermore, the volume of the contact part 41 and the silicon layer 30 would reduce after the silicidation reaction, thereby forming a silicidation gap G between the first silicide 30*a* and the dielectric layer 50. (The silicidation gap G is formed above and partially aside the first silicide 30*a*, and it can be air or vacuum.) As for the connecting contact part 41 and conductive part 42, although the volume is reduced due to the silicidation reaction, the conductive part 42 still has enough area contacting one side of the silicon layer 30. Therefore, the silicide capacitive micro electromechanical structure 1 still has the conductive part 42 contacting the silicon layer 30 after silicidation reaction, so as to remain electrically connected to the external circuit. With such structure, the conductive part 42 of the first metal layer 40 can be regarded as a bottom electrode and a wire section connecting the bottom electrode to the external circuit for the silicide capacitive micro electromechanical structure 1.

Figure 3:
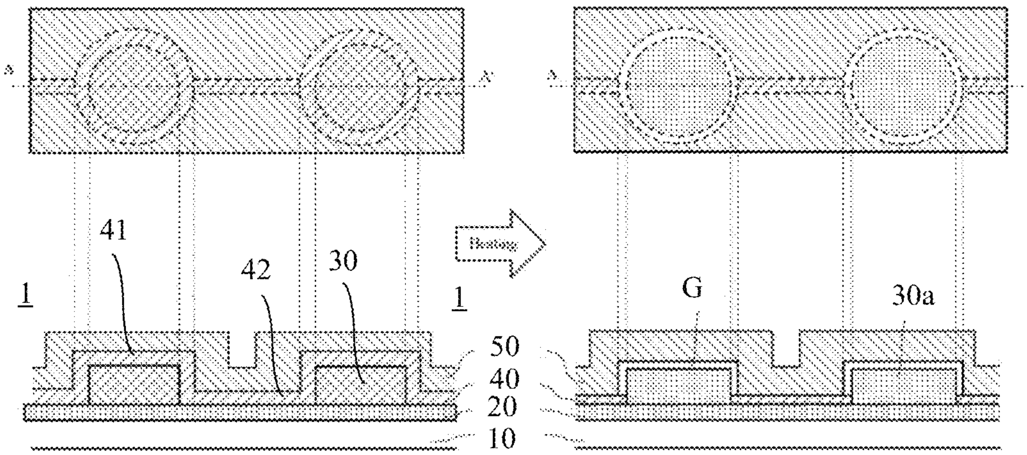
FIG. 3 is a schematic diagram of the present invention in a second embodiment, illustrating a silicide capacitive micro electromechanical structure without performing an annealing process and after performing the annealing process.

FIG. 3 illustrated a second embodiment of the silicide capacitive micro electromechanical structure 1. As shown in FIG. 3, a plurality of the silicide capacitive micro electromechanical structures 1 can be designed to electrically connect to each other. In this embodiment, the passivation layer 20 is formed on the substrate 10 and then a plurality of silicon layers 30 are formed on the passivation layer 20 with intervals in-between as needed. The first metal layer 40 covers on every silicon layer 30; wherein the first metal layer 40 has the contact part 41 completely covering a top and both sides of the silicon layers 30 and has two conductive parts 42 arranged correspondingly for each silicon layer 30, each conductive part 42 being electrically connected to the external circuit or to another conductive part 42 of a neighboring silicide capacitive micro electromechanical structure 1.

After an annealing process, the contact part 41 of the first metal layer 40 produces the first silicide 30*a* via silicidation reaction with the silicon layer 30 and forms the silicidation gap G (the silicidation gap G is formed on and aside the first silicide 30*a*, composing a circular gap). Every two neighboring silicide capacitive micro electromechanical structures 1 are electrically connected to each other, and the silicide capacitive micro electromechanical structure 1 at the far side is electrically connected to the external circuit via the conductive part 42 thereof.

Figure 4A:
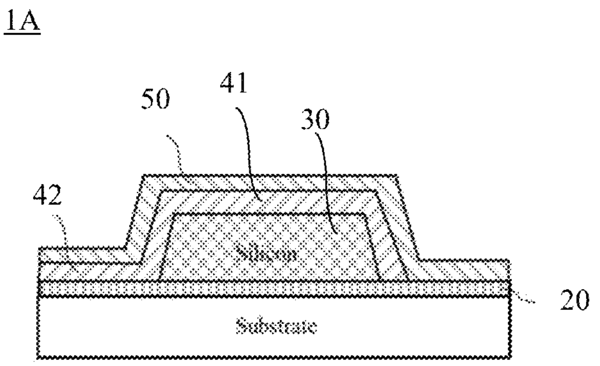
FIG. 4A is a schematic diagram of the present invention in a third embodiment, illustrating a silicide capacitive micro electromechanical structure without performing an annealing process.
Figure 4B:
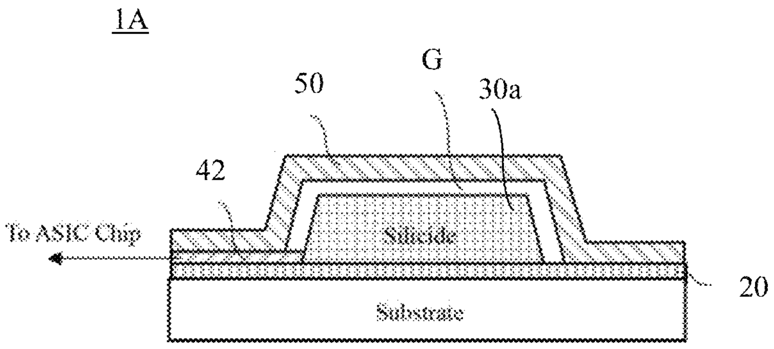
FIG. 4B is a schematic diagram of the present invention in the third embodiment, illustrating the silicide capacitive micro electromechanical structure after performing an annealing process.

Referring to FIGS. 4A and 4B, a third embodiment of the silicide capacitive micro electromechanical structure 1A is illustrated. As shown in FIG. 4A, in this embodiment, the silicide capacitive micro electromechanical structure 1A has the silicon layer 30 formed in a truncated circular cone shape and partially covering the passivation layer 20. The angle between the truncated circular cone and the passivation layer 20 is between 20° and 70°. The first metal layer 40 has the contact part 41 completely covering a top and both sides of the silicon layers 30 and has the conductive parts 42 extending away from the silicon layer 30. With such design, the first metal layer 40 tapers from the contact part 41 towards the conductive part 42 in accordance with the shape of the silicon layer 30, so as to prevent the contact between the first metal layer 40 and the silicon layer 30 from breaking off after an annealing process.

Figure 5:
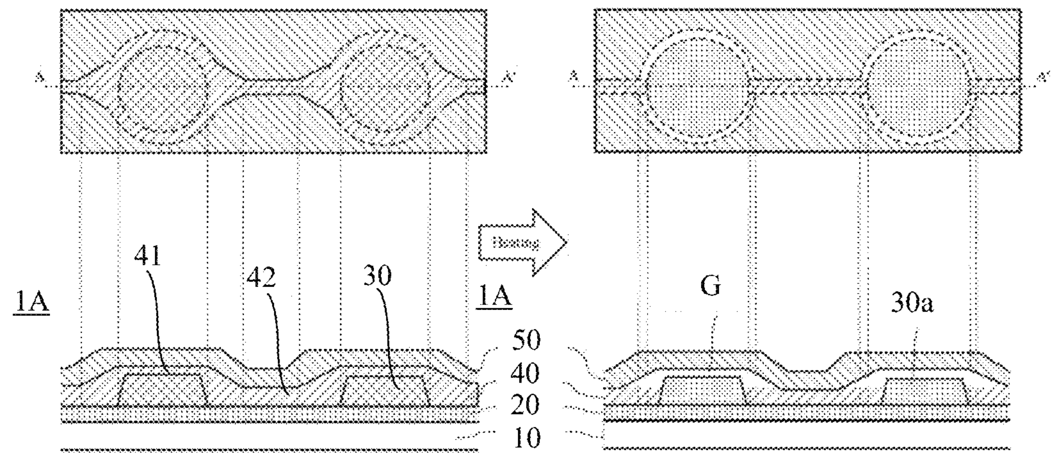
FIG. 5 is a schematic diagram of the present invention in a fourth embodiment, illustrating a silicide capacitive micro electromechanical structure without performing an annealing process and after performing the annealing process.

Referring to FIG. 5, a fourth embodiment of the silicide capacitive micro electromechanical structure 1A is illustrated. Similar to the second embodiment, a plurality of the silicide capacitive micro electromechanical structures 1A can be designed to electrically connect to each other as shown in FIG. 5. In this embodiment, the passivation layer 20 is formed on the substrate 10 and then a plurality of silicon layers 30 are formed on the passivation layer 20 with intervals in-between as needed. The first metal layer 40 covers on every silicon layer 30; wherein the first metal layer 40 has the contact part 41 completely covering a top and both sides of the silicon layers 30 and has two conductive parts 42 arranged correspondingly for each silicon layer 30, each conductive part 42 being electrically connected to the external circuit or to another conductive part 42 of a neighboring silicide capacitive micro electromechanical structure 1A. In this embodiment, in order to prevent the contact between the first metal layer 40 and the silicon layer 30 from breaking off after an annealing process, a width of each conductive part 42 gradually increases as it gets closer to the silicon layer 30 to provide enough amount of metals and enough area for contact.

After an annealing process, the contact part 41 of the first metal layer 40 produces the first silicide 30*a* via silicidation reaction with the silicon layer 30 and forms the silicidation gap G (the silicidation gap G is formed on and aside the first silicide 30*a*, composing a circular gap). Every two neighboring silicide capacitive micro electromechanical structures 1A are electrically connected to each other, and the silicide capacitive micro electromechanical structure 1A at the far side is electrically connected to the external circuit via the conductive part 42 thereof.

Figure 6A:
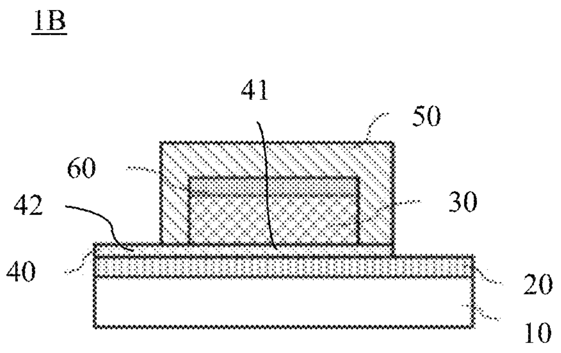
FIG. 6A is a schematic diagram of the present invention in a fifth embodiment, illustrating a silicide capacitive micro electromechanical structure without performing an annealing process.
Figure 6B:
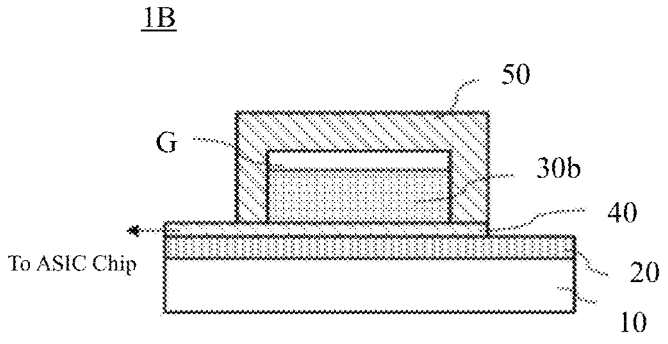
FIG. 6B is a schematic diagram of the present invention in the fifth embodiment, illustrating the silicide capacitive micro electromechanical structure after performing an annealing process.

Referring to FIGS. 6A and 6B, a fifth embodiment of the silicide capacitive micro electromechanical structure 1B is illustrated. As shown in FIG. 6A, in this embodiment, the silicon layer 30 is a layer of circular structure that partially covers the passivation layer 20. The first metal layer 40 is formed on the passivation layer 20 and the contact part 41 thereof is arranged between the silicon layer 30 and the passivation layer 20. That is, the silicon layer 30 will be formed on the contact part 41 of the first metal layer 40. The conductive part 42 still extends away from the silicon layer 30 to be electrically connected to the external circuit. Herein, the first metal layer 40 consists of Tungsten. The dielectric layer 50 is formed on the passivation layer 20 and the first metal layer 40, covering at least the silicon layer 30.

In this embodiment, the silicide capacitive micro electromechanical structure 1B further includes a second metal layer 60 that is formed on the silicon layer 30 and arranged between the silicon layer 30 and the dielectric layer 50. And the second metal layer 60 consists of Ni, Ti, Pt, Co or Mo.

As shown in FIG. 6B, since the second metal layer 60 directly contacts the silicon layer 30, after an annealing process, the second metal layer 60 produces a second silicide 30*b* via silicidation reaction with the silicon layer 30 under the high temperature. Furthermore, the volume of the second metal layer 60 and the silicon layer 30 would reduce after the silicidation reaction, thereby forming a silicidation gap G between the second silicide 30*b* and the dielectric layer 50. (The silicidation gap G is formed above the second silicide 30*b*). Besides, the first metal layer 40 consists of Tungsten, which will not have silicidation reaction with the silicon layer 30 under the temperature of the annealing process. Therefore, even after the annealing process, the silicide capacitive micro electromechanical structure 1B still has the first metal layer 40 stay contacting the silicon layer 30, so as to maintain the electrical connection to the external circuit. With such structure, the first metal layer 40 can be regarded as a bottom electrode and a wire section connecting the bottom electrode to the external circuit for the silicide capacitive micro electromechanical structure 1B.

Figure 7A:
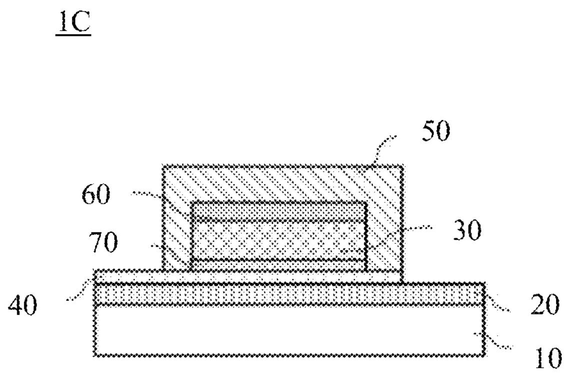
FIG. 7A is a schematic diagram of the present invention in a sixth embodiment, illustrating a silicide capacitive micro electromechanical structure without performing an annealing process.
Figure 7B:
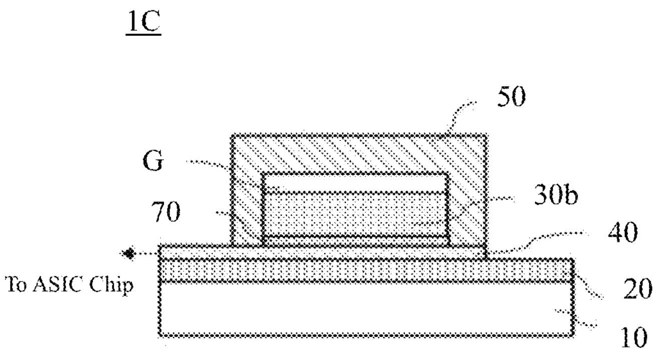
FIG. 7B is a schematic diagram of the present invention in the sixth embodiment, illustrating the silicide capacitive micro electromechanical structure after performing an annealing process.

Referring to FIGS. 7A and 7B, a sixth embodiment of the silicide capacitive micro electromechanical structure 1C is illustrated, and this is a variant embodiment from the fifth. As shown in FIG. 7A, in this embodiment, the first metal layer 40 is not limited to consisting of Tungsten, it can consist of Aluminum (Al), Ti, Tungsten, Gold (Au), Pt, Co or Mo. In order to effectively prevent the first metal layer 40 from silicidation reaction with the silicon layer 30, in this embodiment, the silicide capacitive micro electromechanical structure 1C further includes a barrier layer 70 arranged between the first metal layer 40 and the silicon layer 30. The barrier layer 70 consists of TiN, but the present invention is not limited to such application. Thereby, as shown in FIG. 7B, even the silicide capacitive micro electromechanical structure 1C undergoes the annealing process, the first metal layer 40 will be protected by the barrier layer 70; only the second metal layer 60 produces a second silicide 30*b* via silicidation reaction with the silicon layer 30 and forms the silicidation gap G. With such structure, the first metal layer 40 can still be regarded as a bottom electrode and a wire section connecting the bottom electrode to the external circuit for the silicide capacitive micro electromechanical structure 1C.

Figure 8A:
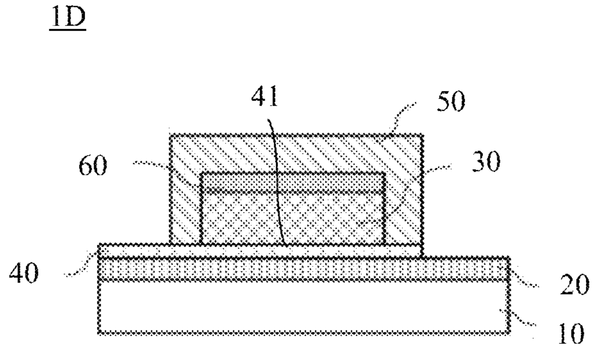
FIG. 8A is a schematic diagram of the present invention in a seventh embodiment, illustrating a silicide capacitive micro electromechanical structure without performing an annealing process.
Figure 8B:
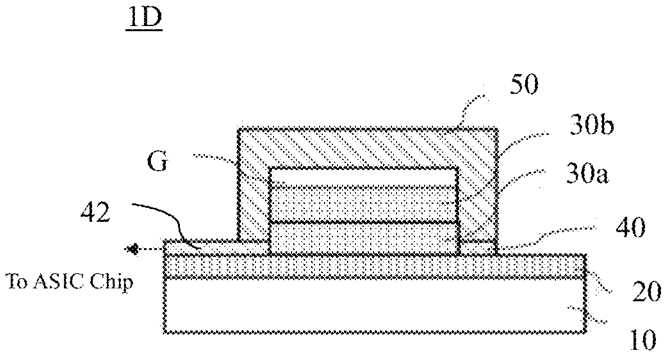
FIG. 8B is a schematic diagram of the present invention in the seventh embodiment, illustrating the silicide capacitive micro electromechanical structure after performing an annealing process.

Referring to FIGS. 8A and 8B, a seventh embodiment of the silicide capacitive micro electromechanical structure 1D is illustrated, and this is a variant embodiment from the fifth. As shown in FIG. 8A, in this embodiment, both the first metal layer 40 and the second metal layer 60 consists of Ni, Ti, Pt, Co or Mo, and the contact part 41 of the first metal layer 40 and the second metal layer 60 individually contact the silicon layer 30 at the top or the bottom thereof. In other words, in this embodiment it is not avoided to have the silicidation reaction occurred between the first metal layers 40 and the silicon layer 30 and between the second metal layers 60 and the silicon layer 30. Instead, the thickness of the silicon layer 30 is increased for this vertical double silicidation reaction. In this embodiment, the silicon layer 30 is slightly thicker than the total amount of thickness consumption on the first and second metal layers 40, 60 from silicidation reaction—for instance, 5% thicker—so that the silicide formed on both top and bottom of the silicon layer 30 would still be electrically conductive due to the diffusion of metallic atoms. With reference to FIG. 8B, with such structure, the contact part 41 of the first metal layer 40 produces the first silicide 30*a* via silicidation reaction with the silicon layer 30 and the second metal layer 60 produces a second silicide 30*b* via silicidation reaction with the silicon layer 30 and forms a silicidation gap G after an annealing process. Even though the first silicide 30*a* is formed by the contact part 41 and the silicon layer 30, the conductive part 42 can still stay contacting the first silicide 30*a* to maintain the electrical connection to the external circuit.

Figure 9A:
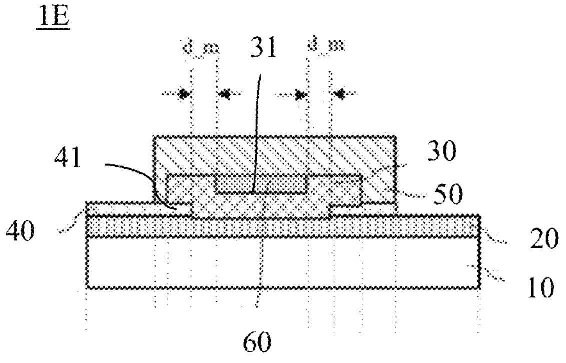
FIG. 9A is a schematic diagram of the present invention in an eighth embodiment, illustrating a silicide capacitive micro electromechanical structure without performing an annealing process.
Figure 9B:
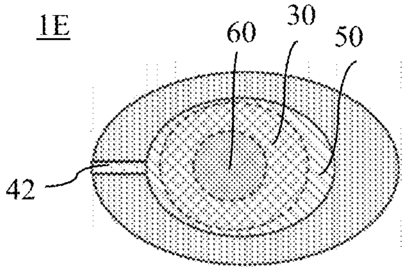
FIG. 9B is a top plan view of the present invention in the eighth embodiment, illustrating the silicide capacitive micro electromechanical structure without performing an annealing process.
Figure 9C:
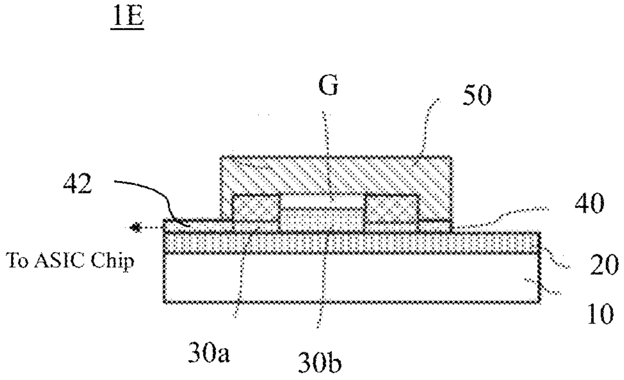
FIG. 9C is a schematic diagram of the present invention in the eighth embodiment, illustrating the silicide capacitive micro electromechanical structure after performing an annealing process.

Referring to FIGS. 9A-9C, an eighth embodiment of the silicide capacitive micro electromechanical structure 1E is illustrated, and this is a variant embodiment from the fifth. As shown in FIGS. 9A and 9B, in this embodiment, both the first metal layer 40 and the second metal layer 60 consists of Ni, Ti, Pt, Co or Mo, and the contact part 41 of the first metal layer 40 and the second metal layer 60 individually contact the silicon layer 30 at the top or the bottom thereof. In other words, in this embodiment it is not avoided to have the silicidation reaction occurred between the first metal layers 40 and the silicon layer 30 and between the second metal layers 60 and the silicon layer 30. However, in this embodiment, the silicon layer 30 forms a depression structure 31 on the top thereof in which the second metal layer 60 is formed. The contact part 41 of the first metal layer 40 forms a circular structure surrounding a center of the silicon layer 30 and the second metal layer 60 is arranged within the area surrounded by the circular structure, resulting in a horizontal distance between the contact part 41 and the second metal layer 60. In an embodiment, the horizontal distance is between 1 μm and 5 μm.

With reference to FIG. 9C, with such structure, the contact part 41 of the first metal layer 40 produces the first silicide 30*a* via silicidation reaction with the silicon layer 30 and the second metal layer 60 produces a second silicide 30*b* via silicidation reaction with the silicon layer 30 and forms a silicidation gap G after an annealing process. Even though the first silicide 30*a* is formed by the contact part 41 and the silicon layer 30, the conductive part 42 can still stay contacting the first silicide 30*a* to maintain the electrical connection to the external circuit. In addition, by keeping the horizontal distance design between the contact part 41 and the second metal layer 60, the ohmic contact of both components can be kept and meanwhile the interferences in the silicidation reaction of the second metal layer 60 from the first metal layer 40 can be prevented as well.

Figure 10A:
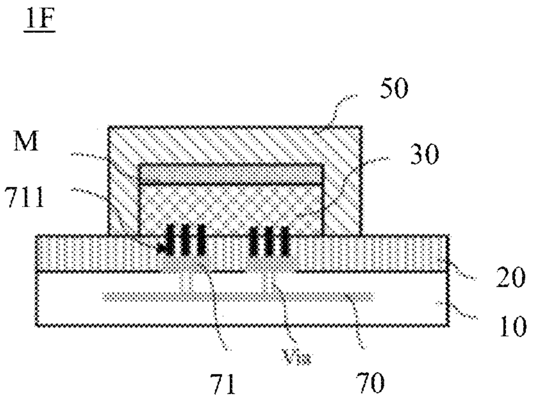
FIG. 10A is a schematic diagram of the present invention in a ninth embodiment, illustrating a silicide capacitive micro electromechanical structure without performing an annealing process.
Figure 10B:
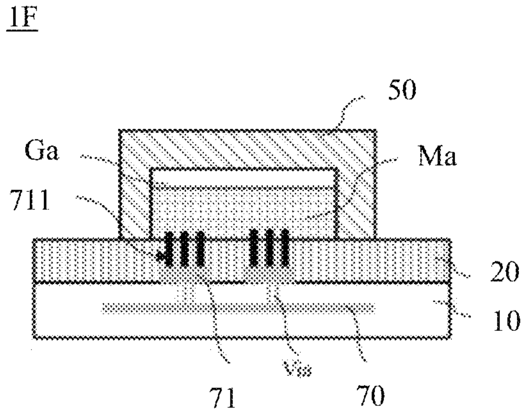
FIG. 10B is a schematic diagram of the present invention in the ninth embodiment, illustrating the silicide capacitive micro electromechanical structure after performing an annealing process.

With reference to FIGS. 10A and 10B, a ninth embodiment of a silicide capacitive micro electromechanical structure 1F is illustrated. As shown in FIG. 10A, in this embodiment, the silicide capacitive micro electromechanical structure 1F includes the substrate 10, the passivation layer 20, the silicon layer 30, a metal layer M, the dielectric layer 50 and a conductive section 70. In the following embodiments, the substrate 10 can be a semiconductor substrate but the present invention is not limited to such application. The passivation layer 20 is formed on the substrate 10 and evenly covers an entire surface of one side of the substrate 10. Herein the passivation layer 20 consists of $SiO_2$ or $Si_3N_4$. The silicon layer 30 is formed on the passivation layer 20. In this embodiment, the silicon layer 30 consists of a-Si. The metal layer M is formed on the silicon layer 30. In this embodiment, the metal layer M consists of Ni, Ti, Pt, Co or Mo. The dielectric layer 50 is formed on the passivation layer 20 and covers the silicon layer 30 and the metal layer M. In embodiment, the dielectric layer 50 consists of $SiO_2$, $Si_3N_4$, $Al_2O_3$, $Al_2O_5$ or $Al_3O_4$.

The conductive section 70 is disposed in the substrate 10 and electrically connected to the external circuit which can be an ASIC or a similar circuit. The conductive section 70 includes at least one conductive element 71 inserted into the passivation layer 20 for contacting the silicon layer 30. The number of the conductive element 71 is adjustable as needed. In this embodiment, the at least one conductive element 71 is a Tungsten plug 711 disposed through the passivation layer 20 to directly contact the silicon layer 30.

As shown in FIG. 10B, since the metal layer M directly contacts the silicon layer 30, after an annealing process, the metal layer M produces a silicide Ma via silicidation reaction with the silicon layer 30 under the high temperature. Furthermore, the volume of the metal layer M and the silicon layer 30 would reduce after the silicidation reaction, thereby forming a silicidation gap Ga between the silicide Ma and the dielectric layer 50. The conductive section 70 will not be affected by the annealing process as it is disposed inside the substrate 10. Since the at least one conductive element 71 is the Tungsten plug 711 that directly contacts the silicon layer 30 and Tungsten will not have silicidation reaction with the silicon layer 30 under the temperature of the annealing process, even after the annealing process, the silicide capacitive micro electromechanical structure 1F still has the at least one conductive element 71 stay contacting the silicide Ma, so as to maintain the electrical connection to the external circuit. With such structure, the conductive section 70 can be regarded as a bottom electrode and a wire section connecting the bottom electrode to the external circuit for the silicide capacitive micro electromechanical structure 1F. Moreover, in this embodiment, the distance the Tungsten plug 711 is inserted into the silicon layer 30 is between 5 nm and 10 nm.

Figure 11A:
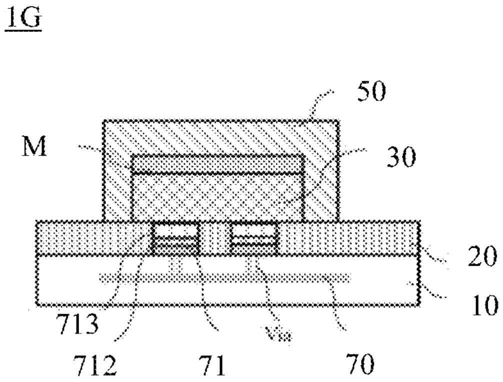
FIG. 11A is a schematic diagram of the present invention in a tenth embodiment, illustrating a silicide capacitive micro electromechanical structure without performing an annealing process.
Figure 11B:
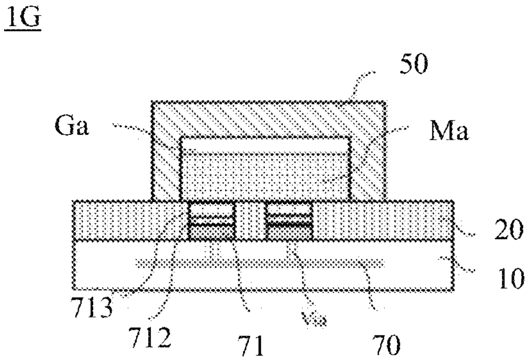
FIG. 11B is a schematic diagram of the present invention in the tenth embodiment, illustrating the silicide capacitive micro electromechanical structure after performing an annealing process.

Referring to FIGS. 11A and 11B, a tenth embodiment of the silicide capacitive micro electromechanical structure 1G is illustrated, and this is a variant embodiment from the ninth. As shown in FIG. 11A, in this embodiment, the silicide capacitive micro electromechanical structure 1G includes the substrate 10, the passivation layer 20, the silicon layer 30, a metal layer M, the dielectric layer 50 and the conductive section 70 as described above.

In this embodiment, the at least one conductive element 71 of the conductive section 70 includes a metal piece 712 and a barrier piece 713; the metal piece 712 indirectly contacts the silicon layer 30 via the barrier piece 713. The metal piece 712 can consist of Al, Ti, Tungsten, Au, Pt, Co or Mo. The barrier piece 713 can consist of TiN, but the present invention is not limited to such application.

As shown in FIG. 11B, the metal layer M produces a silicide Ma and forms a silicidation gap Ga via silicidation reaction with the silicon layer 30 after an annealing process. The conductive section 70 will not be affected by the annealing process as it is disposed inside the substrate 10. Although the at least one conductive element 711 includes the metal piece 712 that will react with the silicon layer 30 for silicidation reaction, the barrier piece 713 is disposed in-between the silicon layer 30 and the metal piece 712; therefore the metal piece 712 can be protected by the barrier piece 713 from the silicidation reaction with the silicon layer 30 after the annealing process. Consequently, even after the annealing process, the silicide capacitive micro electromechanical structure 1G still has the at least one conductive element 71 stay contacting the silicide Ma, so as to maintain the electrical connection to the external circuit. With such structure, the conductive section 70 can be regarded as a bottom electrode and a wire section connecting the bottom electrode to the external circuit for the silicide capacitive micro electromechanical structure 1G.

The fabrication method of a silicide capacitive micro electromechanical structure includes the following steps: providing a substrate; forming a passivation layer on the substrate; forming a silicon layer and a first metal layer on the passivation layer, wherein the first metal layer includes a contact part and a conductive part as the contact part contacting at least partial of the silicon layer and the conductive part extending away from the silicon layer for electrical connection to an external circuit; forming a dielectric layer on the passivation layer, covering at least the silicon layer; and performing an annealing process, wherein the conductive part stays contacting the silicon layer for maintaining an electrical connection to the external circuit.

In an embodiment, the contact part of the first metal layer covers a top of the silicon layer and at least partial of one side of the silicon layer and produces a first silicide after the annealing process via silicidation reaction with the silicon layer, and a silicidation gap is formed between the first silicide and the dielectric layer.

In an embodiment, the contact part is disposed between the silicon layer and the passivation layer, and a step is further included before forming the dielectric layer on the passivation layer. The step is forming a second metal layer on the silicon layer for the second metal layer to be arranged between the silicon layer and the dielectric layer; wherein a second silicide is formed after the annealing process via silicidation reaction of the silicon layer and the second metal layer, and a silicidation gap is formed between the second silicide and the dielectric layer.

All in all, the present invention has the silicide capacitive micro electromechanical structure that forms a silicidation gap via the annealing process to function as an ultrasonic transducer while keeps the silicide electrically connected to the external circuit. This not only resolves the defects in conventional chemical etching process but also eliminates the concerns of the electrical connection between electrodes and the external circuits breaking off resulted from the annealing process, thereby enhancing the efficiency in production and greatly reducing the manufacturing costs.

The present invention is disclosed by the preferred embodiments in the aforementioned description; however, it is contemplated for one skilled at the art that the embodiments are applied only for an illustration of the present invention rather than are interpreted as a limitation for the scope of the present invention. It should be noted that the various substantial alternation or replacement equivalent to these embodiments shall be considered as being covered within the scope of the present invention. Therefore, the protection scope of the present invention shall be defined by the claims.

What is claimed is:

1. A silicide capacitive micro electromechanical structure, comprising:

a substrate;

a passivation layer formed on said substrate;

a silicon layer formed on said passivation layer;

a first metal layer formed on said passivation layer and including a contact part and a conductive part, said contact part contacting at least partial of said silicon layer and said conductive part extending away from said silicon layer to be electrically connected to an external circuit; and a dielectric layer formed on said passivation layer and covering at least said silicon layer;

wherein after an annealing process, the electrical connection to said external circuit remains by having said conductive part stay contacting said silicon layer after silicidation reaction.

2. The silicide capacitive micro electromechanical structure defined in claim 1, wherein the silicon layer comprises amorphous silicon, single-crystal silicon or polysilicon.

3. The silicide capacitive micro electromechanical structure defined in claim 1, wherein the first metal layer comprises Nickel, Titanium, Platinum, Cobalt or Molybdenum.

4. The silicide capacitive micro electromechanical structure defined in claim 1, wherein the dielectric layer comprises $SiO_2$, $Si_3N_4$, $Al_2O_3$, $Al_2O_5$ or $Al_3O_4$.

5. The silicide capacitive micro electromechanical structure defined in claim 1, wherein the contact part produces a first silicide after the annealing process via silicidation reaction with the silicon layer.

6. The silicide capacitive micro electromechanical structure defined in claim 5, wherein the contact part of the first metal layer covers a top of the silicon layer, at least partially covers one side of the silicon layer and forms a silicidation gap between the first silicide formed after the annealing process and the dielectric layer.

7. The silicide capacitive micro electromechanical structure defined in claim 6, wherein the silicon layer forms in a shape of truncated circular cone and an inclined angle aside said truncated circular cone is between 20° and 70°.

8. The silicide capacitive micro electromechanical structure defined in claim 1, wherein a width of the conductive part gradually increases as it gets closer to the silicon layer.

9. The silicide capacitive micro electromechanical structure defined in claim 1, wherein the contact part is arranged between the silicon layer and the passivation layer.

10. The silicide capacitive micro electromechanical structure defined in claim 9 further comprising a barrier layer arranged between the first metal layer and the silicon layer.

11. The silicide capacitive micro electromechanical structure defined in claim 10, wherein the first metal layer comprises Aluminum, Titanium, Tungsten, Gold, Platinum, Cobalt or Molybdenum.

12. The silicide capacitive micro electromechanical structure defined in claim 9, wherein the first metal layer comprises Tungsten.

13. The silicide capacitive micro electromechanical structure defined in claim 9 further comprising a second metal layer formed on the silicon layer and arranged between the silicon layer and the dielectric layer, wherein a second silicide is produced after the annealing process via silicidation reaction of the silicon layer and the second metal layer, and a silicidation gap is formed between the second silicide and the dielectric layer.

14. The silicide capacitive micro electromechanical structure defined in claim 13, wherein the contact part is a circular structure surrounding a center of the silicon layer and the second metal layer is formed in a recession structure formed on a top of the silicon layer.

15. The silicide capacitive micro electromechanical structure defined in claim 14, wherein a minimum horizontal distance between the contact part and the second metal layer is between 1 μm and 5 μm.

16. The silicide capacitive micro electromechanical structure defined in claim 1, further comprising a top electrode formed on top of the dielectric layer.

17. A silicide capacitive micro electromechanical structure, comprising:

a substrate;

a passivation layer formed on said substrate;

a silicon layer formed on said passivation layer;

a metal layer formed on said silicon layer;

a dielectric layer formed on said passivation layer and covering said silicon layer and said metal layer; and a conductive section disposed inside said substrate, electrically connected to an external circuit and including at least one conductive element inserted into said passivation layer for contacting said silicon layer;

wherein after an annealing process, the electrical connection to said external circuit remains by having said at least one conductive element stay contacting said silicon layer after silicidation reaction.

18. The silicide capacitive micro electromechanical structure defined in claim 17, wherein the at least one conductive element is a Tungsten plug disposed through the passivation layer to directly contact the silicon layer.

19. The silicide capacitive micro electromechanical structure defined in claim 17, wherein the at least one conductive element includes a metal piece and a barrier piece, and the metal piece indirectly contacts the silicon layer via the barrier piece.

20. A fabrication method of a silicide capacitive micro electromechanical structure, comprising:

providing a substrate;

forming a passivation layer on said substrate;

forming a silicon layer and a first metal layer on said passivation layer, wherein the first metal layer includes a contact part and a conductive part as said contact part contacting at least partial of said silicon layer and said conductive part extending away from said silicon layer for electrical connection to an external circuit;

forming a dielectric layer on said passivation layer, covering at least said silicon layer; and performing an annealing process, wherein the conductive part stays contacting the silicon layer for maintaining an electrical connection to said external circuit.

21. The fabrication method defined in claim 20, wherein the contact part of the first metal layer covers a top of the silicon layer and at least partial of one side of the silicon layer and produces a first silicide after said annealing process via silicidation reaction with the silicon layer, and a silicidation gap is formed between said first silicide and said dielectric layer.

22. The fabrication method defined in claim 20, wherein the contact part is disposed between the silicon layer and the passivation layer, and a step is further included before forming the dielectric layer on the passivation layer, said step being: forming a second metal layer on said silicon layer for said second metal layer to be arranged between said silicon layer and said dielectric layer; wherein a second silicide is formed after the annealing process via silicidation reaction of the silicon layer and the second metal layer, and a silicidation gap is formed between the second silicide and the dielectric layer.

* * * * *